Sept. 6, 1966  T. A. BANNING, JR  3,270,762
MULTIPLE SUPPLY, BALANCED VALVE, PRESSURE REDUCING
VALVES, AND THE LIKE
Original Filed Feb. 3, 1956  5 Sheets-Sheet 1
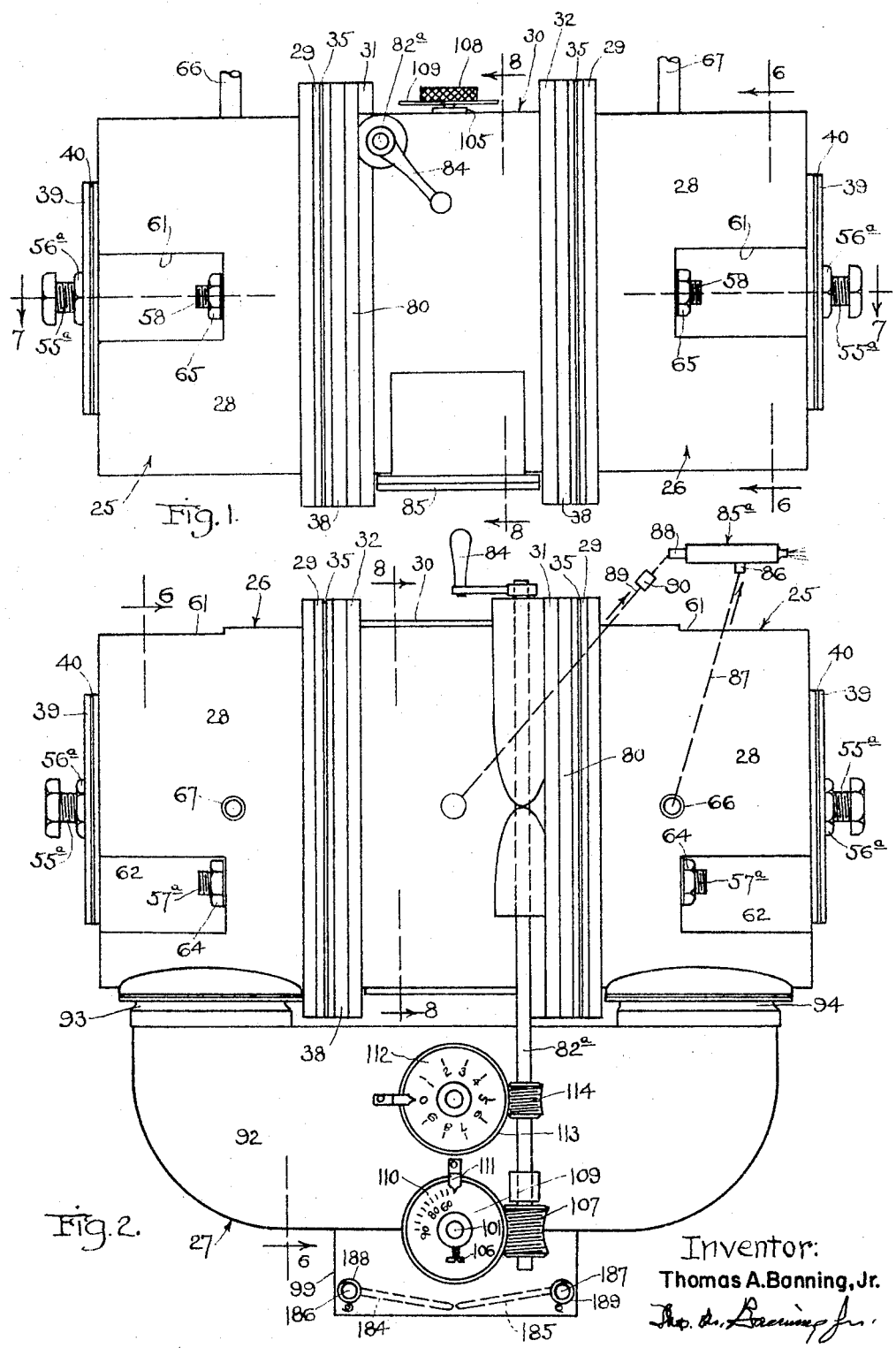
Inventor:
Thomas A. Banning, Jr.

Sept. 6, 1966   T. A. BANNING, JR   3,270,762
MULTIPLE SUPPLY, BALANCED VALVE, PRESSURE REDUCING
VALVES, AND THE LIKE
Original Filed Feb. 3, 1956   5 Sheets-Sheet 2

Inventor:
Thomas A. Banning, Jr.

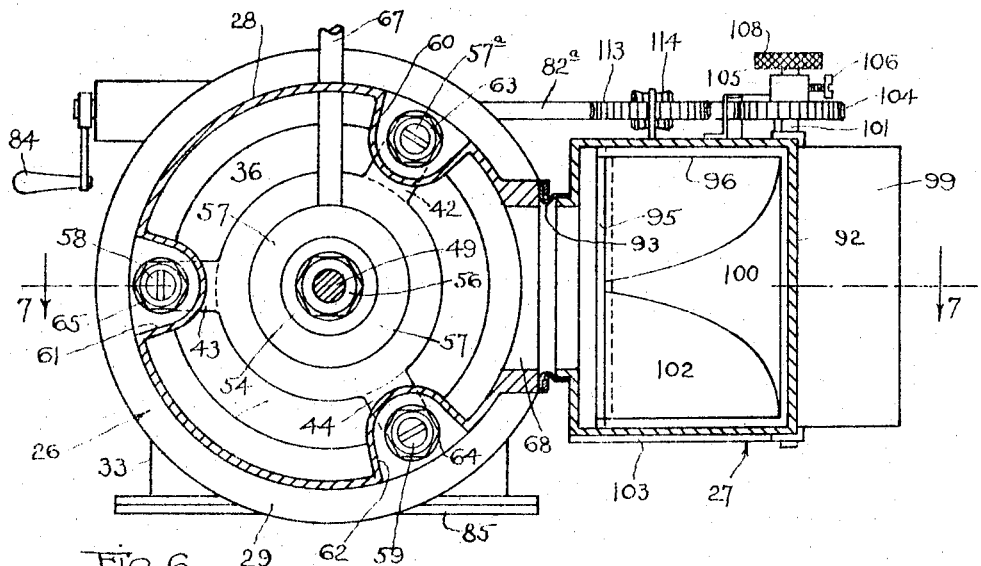
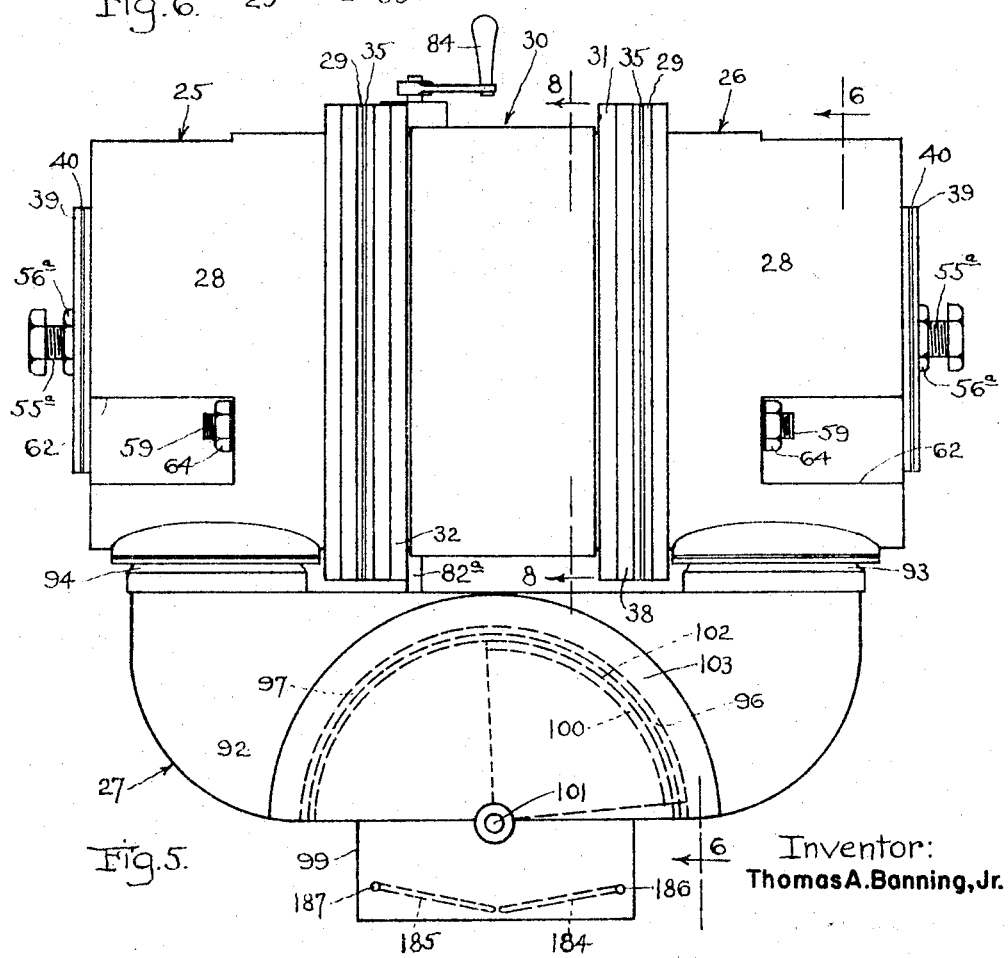

Sept. 6, 1966 T. A. BANNING, JR 3,270,762
MULTIPLE SUPPLY, BALANCED VALVE, PRESSURE REDUCING
VALVES, AND THE LIKE
Original Filed Feb. 3, 1956 5 Sheets-Sheet 4
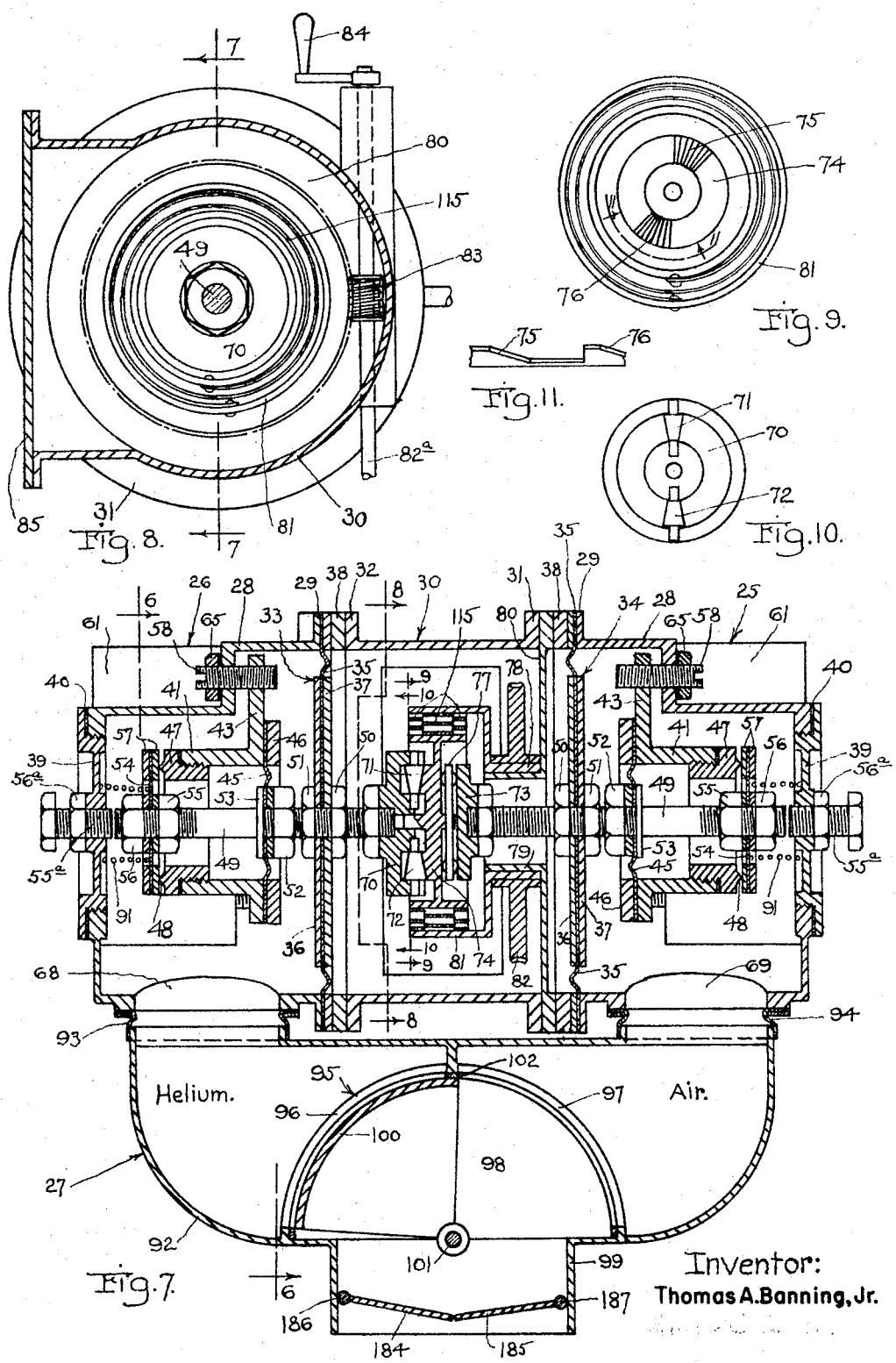
Inventor:
Thomas A. Banning, Jr.

Sept. 6, 1966  T. A. BANNING, JR  3,270,762
MULTIPLE SUPPLY, BALANCED VALVE, PRESSURE REDUCING
VALVES, AND THE LIKE
Original Filed Feb. 3, 1956  5 Sheets-Sheet 5

Inventor:
Thomas A. Banning, Jr.

United States Patent Office 3,270,762
Patented Sept. 6, 1966

3,270,762
MULTIPLE SUPPLY, BALANCED VALVE, PRESSURE REDUCING VALVES, AND THE LIKE
Thomas A. Banning, Jr., 5500–5520 S. Shore Drive, Apt. 1408, Chicago, Ill.
Application May 5, 1961, Ser. No. 107,948, which is a division of application Ser. No. 563,306, Feb. 3, 1956, now Patent No. 3,217,730, dated Nov. 16, 1965. Divided and this application Oct. 5, 1965, Ser. No. 493,156
7 Claims. (Cl. 137—98)

This invention relates to multiple supply, balanced pressure, proportion controlling, reducing valves, and the like.

This application is a division of my earlier application for Letters Patent of the United States, Serial No. 107,-948, for Improvements in Multiple Supply, Balanced Valve, Pressure Reducing Valves, and the Like, filed May 5, 1961, allowed March 23, 1965, and which will issue as Patent No. 3,217,730, granted November 16, 1965, which application, Serial No. 107,948 was a division of my earlier application, Serial No. 563,306, for Improvements in Life Sustaining Atmospheres, Mixtures of Gases, and Means for producing the Same, and Controlling the Pressures and Proportions Thereof, filed February 3, 1956, and which became abandoned after February 27, 1962.

In various operations it is necessary to bring together two or more fluids under conditions such that the proportions of such fluids bear a definite relation to each other, so that the composition of the mixture shall be of known proportions. Various means and structures have been well known and used widely, for producing such operations; but in cases where the fluids comprise gases of "fixed" nature, the control of the proportioning becomes more difficult, due to the high rate of dispersal of such gases at the instant of bringing them together; and this condition is aggravated when the specific gases are of widely different values. The difficulty of producing closely controlled mixtures of the foregoing characteristics is further aggravated when the controlled proportion mixtures are to be produced during or closely related to a pressure reducing operation, where conditions of expansion of the components are a further disturbing factor to the production of the exactness of proportion desired in the mixture produced.

A notable example of the difficulties presented in the foregoing statements resides in the mixing and proportioning of helium and oxygen for production of controlled proportion mixtures of such ingredients, especially when the produced mixture comprises gases which have just been reduced from high pressure sources, such as high compression flasks, to pressures of the order of 50 to 100 or 200 p.s.i., the pressures in the flasks falling as the contents are delivered, so that the degree or extent of the reduction varies greatly over an interval of time of the operation, while, at the same time the delivered pressure of the mixture is also being varied under control. This operation may also be further aggravated when the delivery pressure must also be varied, as, for example, during the descent of a diver to deeper amounts of submergence, or conversely, coming up.

The foregoing relationships have been rather fully discussed in my earlier applications, from which the present case is pendant; so that extended repetition of such operations is not deemed necessary in this case. The relationships above mentioned do, however, affect the desirability of various of the structures and relationships of such structures to each other, presently to be disclosed.

Certain of the objectives to which the present structures are directed include the following:

The delivery openings and passages through which the gases at reduced pressure must travel from the pressure reducing valve elements, are large and untrammeled with needless changes of direction, to a control valve by which the two gas flows are properly controlled, and are brought together. Examination of the structures hereinafter to be described, will show that such gas flows for both of the reduced pressure components, are almost by direct lines, with but a single widely curved change in direction of the gas flow, to the common proportion controlling valve, and the mixing chamber to which the gases are directly delivered by such valve. Such examination will also show that the proportion controlling valve is so designed and constructed that there will be a minimum amount of turbulence produced in each component during its flow through the orifice of its control, and until the mixing chamber is entered. Thus the interference with correct and intended proportioning will be affected to a minimum degree during the proportion controlling operation.

A further feature of the invention relates to the form of the proportioning valve itself, in relation to its function of receiving gas from the two supply conduits, whereby a single proportioning valve serves both of the gases, providing for them orifices whose openings are simultaneously varied when change of proportion of the gas rates is made, according to the intended change in the proportions of the two gases being mixed. This valve includes a mask plate wherein are provided openings for the two gas flows to the mixing chamber; such openings being of such form that a single movable shield, when moved, increases the opening for one of the gases at the same time that the opening for the other gas is decreased; such increases and decreases being in proportions such that at intermediate stages of the full movement of the valve, the then exposed sizes of the respective openings will be related according to the proportions of the mixture desired for such valve position of movement. In connection with this feature it is a further object to enable change in the various proportions produced by successive amounts of valve movement, to meet specifications imposed by the particular use to which the valve is to be placed. In the particular embodiment hereinafter shown and described, the valve is used for controlling the mixture of helium and oxygen, or helium and air, according to the successive hydrostatic pressures existing at successive depths of water at which a diver may be; and to ensure changes of the ratio as the diver descends to deeper and deeper water areas, or rises from them; when, in fact it is desired to effect change of such ratios in order to ensure supply of desired amounts to the diver, of oxygen carried by the mixture of oxygen (or air), and helium or other usable inert gas, other than nitrogen.

In connection with the foregoing object, it is a further object to effect such change of ratio automatically, during a descent or a raising operation, ensuring that at all times the correct ratio between the gases will be supplied to the diver.

Still further, in connection with the foregoing objective it is an object to properly relate such changing ratio to the delivered pressure of the gases, required according to the water depth of location of the diver. Also, in this connection, to make provision for effecting such changes of pressure of the delivered gases, synchronously with changes of the proportions of the two gases, and also according to the descended depth which has been attained by the diver, either increasing or decreasing such depth.

Other objects and uses of the invention are to provide a very simple form of such control valve, consistent with its intended functions, a structure which can be built of rugged design, consistent with the nature of the operations with which it is intended to be used; and a structure which can be readily assembled or disassembled from time to time, as needed for various purposes.

Also to provide a structure which embodies both of the features of a dual pressure reducing valve wherein the delivered pressures of two components are equalized for all adjusted delivery pressures, and wherein the provision is made for delivering the mixture under mixing conditions such that the proportions of the two components may be changed through a wide range of proportions; combined with structural means whereby, for specified conditions of operation, variations of the delivered pressure of the mixture shall be accompanied by variations of the proportions which the components bear to each other, according to a prescribed formula of these two operative conditions, relative to each other. The arrangements are also such that such variations of the proportions of the two components with respect to each other, may be related to the variations of the delivered pressure of the mixture under operative conditions imposed by a wide range of the formulas relating these two sets of variations, to each other.

Other objects and uses of the invention will appear from a detailed description of the same, which consists in the features of construction and combinations of parts hereinafter described and claimed.

In the drawings:

FIGURE 1 shows a front elevational view of the assembled dual or duplex pressure reducing valve unit;

FIGURE 2 shows a top plan view corresponding to FIGURE 1, but with the unit rotated 180 degrees in the top plan viewing;

FIGURE 5 shows a bottom plan view corresponding to FIGURE 2, when the unit is rotated 180 degrees about a central horizontal axis parallel to the top of the unit;

FIGURE 6 shows a cross-section on the lines 6—6 of FIGS. 1, 2, 4, 5 and 7, looking in the directions of the arrows, the parts being set to the low-pressure delivery position, with the valve ratio controlling valve fully closed against one component (of gas or other fluid), and fully opened to the other component;

FIGURE 7 shows a plan section on the lines 7—7 of FIGURES 1, 3, 4, 6 and 8, looking in the directions of the arrows; with the ratio controlling valve in position fully closed against one component, and fully opened to the other component;

FIGURE 8 shows a cross-section on the lines 8—8 of FIGURES 1, 2, 4, 5 and 7, looking in the direction of the arrows; and it shows especially the spring control for controlling the delivery pressures;

FIGURE 9 shows a fragmentary section taken on the line 9—9 of FIGURE 7, looking in the direction of the arrows; and it shows the control cam;

FIGURE 10 shows a fragmentary section taken on line 10—10 of FIGURE 7, looking in the direction of the arrows; and it shows the roller holder and the rollers which operate the cam;

FIGURE 11 shows a fragmentary side view of the cam, developed, being a detail view, and being taken on the line 11—11 of FIGURE 9, looking in the direction of the arrows;

Figure 3:
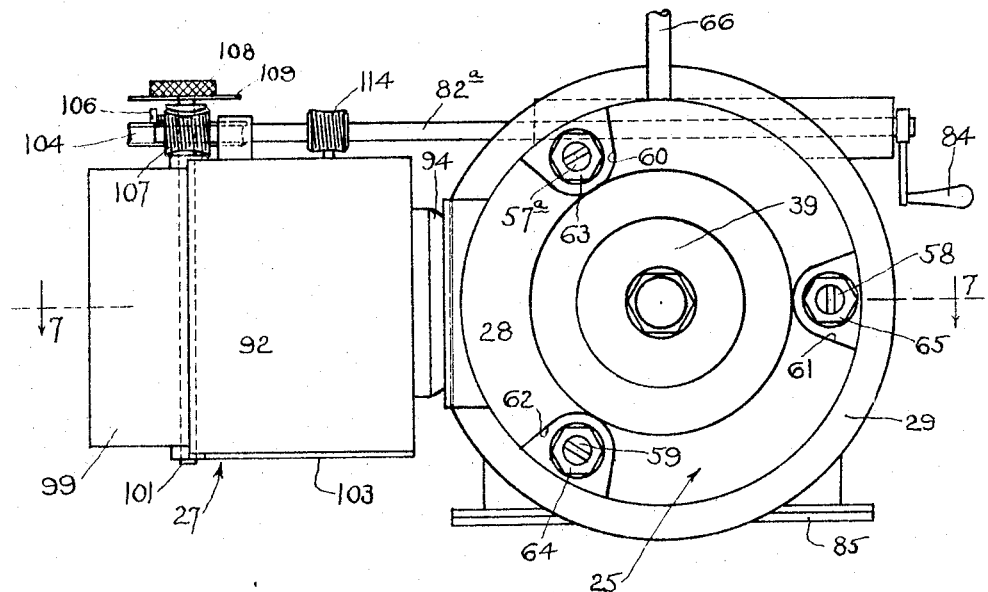
FIGURE 3 shows a left side view corresponding to FIGURE 1.
Figure 4:
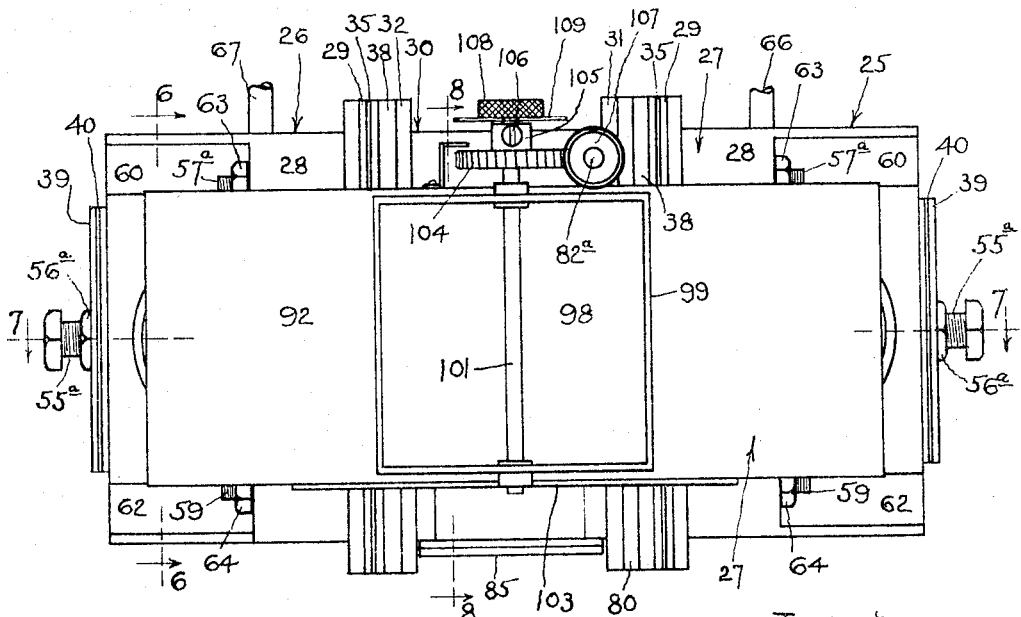
FIGURE 4 shows a back or delivery end view corresponding to FIGURE 3.
Figure 13:
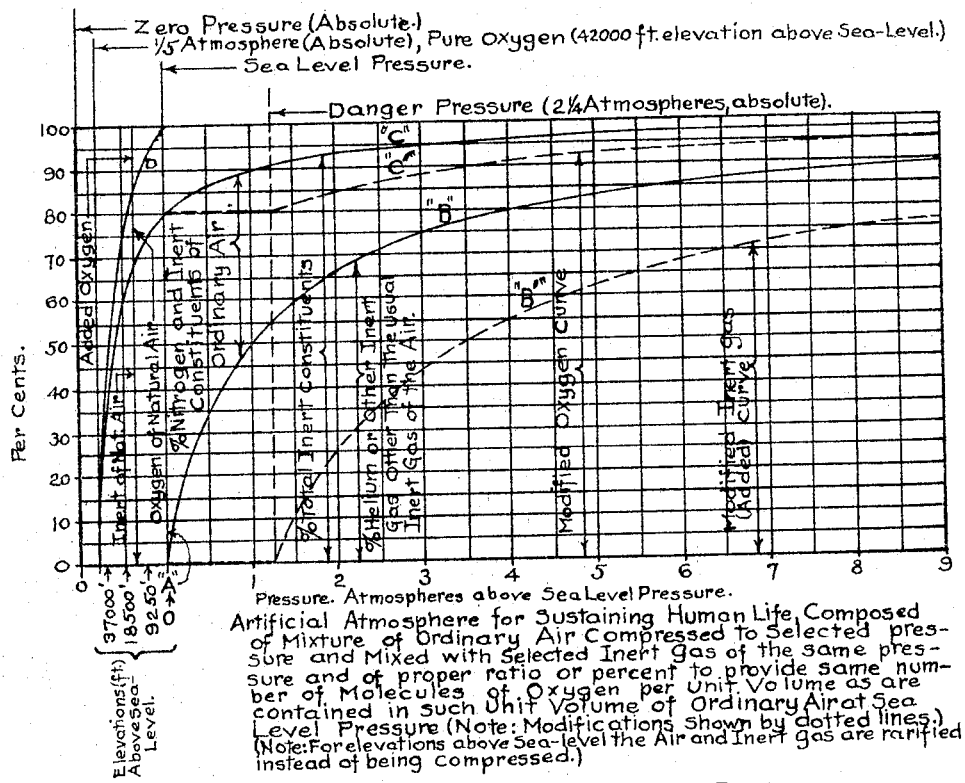
Figure 12:
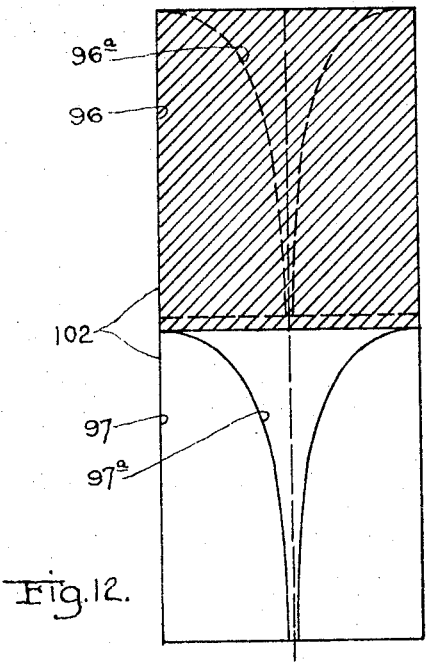
FIGURE 12 shows a development of the ports of the valve, showing the two ports of the mask developed into a plane; and one of the ports is shown fully closed by the shading, and the other port is shown fully open by the lack of shading.
Figure 14:
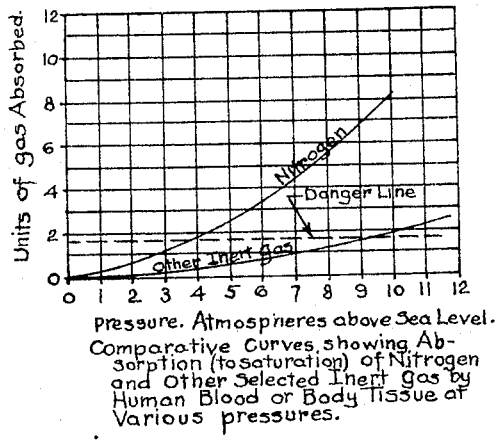

FIGURE 13 shows by means of curves the variation of the ratios of the components of a typical mixture with change of the delivery pressure, the curves being carried backwardly from the sea-level pressure line, to show that for pressures lower than sea-level percentage of oxygen should be increased in order to ensure the same number of molecules of oxygen per cubic centimeter as are provided in ordinary air at sea-level pressure; and FIGURE 14 shows, by means of curves, the variation absorption of the inert gas by the blood stream and bodily tissues, with variations of pressure, both for nitrogen and for another inert gas; the curves being typical, and being related to a danger line.

Referring to FIGURE 13, I have therein shown by means of curves the ratios of pressures to percentages for various conditions of use of mixtures of gases at various pressures and at varying ratios. Pressures are shown by the abscissae and percentages are shown by the ordinates. These curves show the relationships between such pressures and ratios or percentages of components of an artificial atmosphere, intended for supply to and used by a deep-sea diver, or for use under conditions similar to such deep-sea diving operations. The sea-level pressure is shown by the line A. The line C shows the oxygen curve for a mixture in which the percentage of oxygen is varied with variations of pressure in such manner that there is always the same number of molecules of oxygen in each cubic centimeter as at sea-level condition of natural air. Thus, at sea-level pressure this curve passes through the point of 80% (there being substantially 80% of inert gases in natural air, actually 79.01%) and there being substantially 20% oxygen in natural air (actually 20.99%). The figures shown on the curve are, however, very close to theoretical. As the pressure is increased above the sea-level pressure, the percentage of oxygen decreases, being the distance between the curve C and the 100% line, so that, for example, at 3 atmospheres above sea-level pressure the percentage of inert gas is shown as 95%, and that of oxygen as 5%; or at 9 atmospheres above sea-level pressure, the percent inert is shown as 98% and the percent oxygen as 2%; but in all these cases there will be the same number of molecules of oxygen per cubic centimeter as at sea-level pressure, so that the breather will receive at each breath the same full number of molecules of oxygen.

Conversely, the curve C has been carried backwardly from the line A to pressures lower than sea-level pressures, such as exist in higher altitudes. The curve C shows increasing percentages of oxygen for such reduced pressures, with fall to 60% inert gases and 40% oxygen at one-half atmosphere absolute, and 0% inert gases and 100% oxygen at ⅕ atmosphere absolute, corresponding to an elevation substantially 38,000 feet above sea-level. That is to say, at ½ atmosphere absolute, corresponding to 17,000 feet above sea-level there should be substantially 60% inert gases and 40% oxygen to provide a normal oxygen content gas mixture; and at ⅕ atmosphere absolute, corresponding to 38,000 feet above sea-level there should be a 100% oxygen content gas mixture; and at other intermediate pressures or elevations there should be correspondingly proportioned gas mixtures, as shown by the curve C. With all such mixtures, the breather would receive a full supply of oxygen at each breath, and thus should not experience discomfort due to shortage of oxygen. I therefore contemplate variations of the oxygen content both above and below sea-level pressure operations; and the reducing valve units herein disclosed are capable of producing the desired mixture of oxygen (or other gas) and inert (or other gas), under controlled conditions of operation of such units.

The curve B shows variation of percent of added inert gas when the mixture comprises compressed natural air and other compressed inert gas added thereto; both of such compressed gases being brought to the same controlled reduced pressure, and then mixed together under such equality of pressures in the controlled ratio of such gases to each other. The space between the lines B and C represents the proportion of nitrogen, and the space below the line B represents the proportion of such added inert gas, such as helium, when the mixture being produced comprises a mixture of natural air and helium. Thus, for a pressure of 3 atmospheres above sea-level pressure the inert components should comprise inert constituents of the original natural air, and 75% compressed helium, being a total of 95% inert constituents; and there would remain 5% oxygen content, with the same number of molecules of oxygen per cubic centimeter as at sea-level pressure. Or, at 9 atmospheres above sea-level, the percent inert components of the original compressed air would be 8%, and the percent added compressed helium, or other added inert gas, would be 90%, being a total of 98% compressed inert constituents.

The added inert gas in the examples given above may be helium, argon, krypton, xenon, or other gas suitable for the purposes of use to which the mixture is to be placed; but helium has been found to be desirable for various reasons. Sometimes a combination of two or more such added gases may be used. In any case the amount of the nitrogen, measured as percent of the mixture, will thereby be lowered, with attendant benefits well understood in the arts. In some cases all of the added inert gas might be nitrogen, under the conditions of controlled reduced pressure (from the source of supply), and controlled ratio of the total inert gas to other component, such as oxygen.

In FIGURE 13 I have also shown, by the curves C′ and B′ the percentages of oxygen and of added inert gas to obtain the desired constancy of oxygen content, when the base pressure is assumed to be 1¼ atmospheres above sea-level pressure, instead of sea-level pressure itself. In the case of curve C′ the percent oxygen has been constant at 80% up to the pressure of 1¼ atmospheres above sea-level pressure; after which, for higher pressures such curve rises in proper form to establish or maintain the same number of molecules of oxygen per cubic centimeter as are contained in a cubic centimeter of natural air at 1¼ atmospheres above sea-level pressure, the inert gases of the mixture including such proportions of added inert gas as are needed to conform to the requirements of the curve. For example, at the pressure of 3 atmospheres above sea-level pressure, the oxygen content would be about 12% (instead of 5% as in the previous example); and the total inert gases would be 88% (instead of 95% as in the previous example); and at a pressure of 9 atmospheres above sea-level pressure, the oxygen content would be 4½% (instead of 2% as in the previous example), and the total inert gases would be 95½% (instead of 98%, as in the previous example). Under these conditions, too, the nitrogen content would fall from 80% at 1¼ atmospheres above sea-level pressure, to 18% at 9 atmospheres above sea-level pressure.

In FIGURE 14 I have shown, more or less diagrammatically, the fact that the units of compressed gas absorbed by human blood and tissues, is less in the case of helium or other inert gases, than the absorption of nitrogen, and thus, that a greater degree of compression may be safely used in such operations as deep-sea diving operations, than when all of the inert gas is nitrogen. The "danger-line" (corresponding to substantially 1¼ atmospheres above sea-level) is also shown on the chart of this figure.

The ability to provide the desired mixture of gases under exact control of the ratios of such mixture's components, requires that both of the gases of such mixture shall be delivered to the mixing valve under close control of both pressures and ratios, and that the connections from the reducing valves for the components, to the mixing chamber shall be of the same length, and very short. I have therefore provided a dual or duplex reducing valve and mixing valve arrangement complying with the above stated requirements. The same is now described in detail as follows.

Referring to FIGURES 1 to 12, inclusive, there are the two reducing valves 25 and 26, and the mixing valve and chamber unit 27, immediately adjacent thereto. Each reducing valve includes the generally cylindrical chamber 28 of cup shape provided with the inner end flange 29. There is also the intermediate cylindrical chamber 30, having the flanges 31 and 32. At the inner ends of the chambers 28 of the two reducing valves are the diaphragms 33 and 34, each including a thin flexible corrugated plate or diaphragm 35, and the two rigid central plates 36 and 37 which are secured to its central portion unyieldingly, but which allow the diaphragm as a whole to flex easily. The peripheral portions of these diaphragms and clamped firmly between the flanges 29 and the rings 38 which are set against said peripheral portions and secured together.

The outer or cup portion of each of the chambers 28 is provided with a relatively large opening which is closed by a plug 39, preferably with the intervening washer 40. Within each of the chambers 28 there is supported the high pressure chamber 41, having the three outwardly projecting arms 42, 43 and 44 by which it is supported in place; and the inner end of each of the high pressure chambers 41 is provided with the diaphragm 45 of sufficient flexibility to allow for flexing during the opening and closing operations of the valve, but of sufficient strength to resist the high pressure gas within the chamber. The peripheral portion of each diaphragm 45 is secured to the inner end of the chamber 41 by the ring 46.

The outer end of each of the high pressure chambers is provided with a removable ring 47, screw threaded into place, and provided with the outwardly extending circular ridge or seat 48, having a relatively sharp edge, and the sealing edge portion thereof is preferably ground to secure a gas tight fit. The opening which receives the plug 39 already referred to is large enough to permit access to the ring 47, and other parts, and removal thereof from time to time for replacement or adjustment through the unplugged opening.

There is a stem 49 which extends through the diaphragms 35 and 45, and is secured rigidly thereto by the set screws 50, 51, 52 and 53 (the portion 53 being shown for convenience as a flange on the stem itself). By these set screws the diaphragms are caused to operate with flexing movement as a unit, also their movements are controlled.

Each stem 49 carries the valve member for the high pressure valve which it controls. This is in the form of a slightly flexible disk 54 which is clamped between the set screws 55 and 56 of the stem, and the edge portion of such slightly flexible disk carries the ring shaped seating member 57 in the form of a pair of rings clamped around the edge portion of the disk 54. The inner one of these rings serves to seat against the seat 48, and for this purpose its inner face is preferably ground accurately. Also, the flexibility of the disk 54, while being sufficient to permit accurate seating of the ring against the stationary seat, still is strong enough to resist the internal pressure of the gas within the chamber 41, so that the seating and unseating of the ring are properly controlled by the stem 49.

The effective area of the disk 45 and the valve, to the line of contact with the stationary seat, are equal to each other, so that the internal pressure within the chamber 41 is balanced, and only very slight forces need be exerted on the stem 49 to effect opening and closing movements of the valve. It will, of course be understood that the stem itself is subjected to a large force between the positions of the disk 54 and diaphragm 45, but this force is purely internal, and does not affect the force needed to effect the closing and unclosing movements of the valve as a whole. Due to the presence of the removable plug 39, the screws can be reached for adjustment from time to time to bring the parts into proper adjustment.

The plug 39 carries the outwardly extending set pin or stop 55ᵃ which is provided with the set screw 56ᵃ by which it may be locked in adjusted position. The clearance between the inner end of this set pin and the stem 49 is slight, being only a few hundredths of an inch, to permit full opening and closing movements of the disk valve under limited control.

The arms 42, 43 and 44 which extend out from the high pressure chamber 41 are carried by the screws 57ᵃ, 58 and 59, respectively. These are threaded through the floors of recesses 60, 61 and 62 formed in the wall of the chamber 28, so that these screws may be reached from the outside of the device for adjustment and change without having to completely disassemble the device. Each of the screws 57ᵃ, 58 and 59 is threaded through both the floor of the chamber recess and the arm of the high pressure valve chamber; and in order to be able to secure adjustments of the arm positions by merely turning the screws, these screws are provided with reverse threads on their two ends, so that turning the screw serves to draw the arm towards the floor, or vice versa, depending on the direction of such turn. Lock screws or nuts 63, 64 and 65 are provided on the screws as shown.

There is a high pressure supply tube connected into each of the high pressure chambers 41, these being the tubes 66 and 67. They are passed through the chambers 25 and 26 in gas tight manner, the details of which need not be disclosed, as any suitable form of such connection may be used.

The chambers 25 and 26 are provided with the delivery openings 68 and 69 through which the low pressure gases are delivered to the mixing valve and chamber, presently to be explained. These openings are preferably of relatively large size due to the fact that the gas volumes which they handle are enlarged in proportion to the expansion taking place in the reducing valves. It will be understood, however, that these delivery pressures are equal, as will be presently explained. It is also noted that due to the large cross-sections of such passages, the lineal rate of gas flow through them is reduced in proportion to that which would occur for smaller cross-section passages. This benefits the objectives previously stated in this case, since thereby the production of turbulence in the flowing gases is reduced.

It will be understood that in operation the high pressure gas enters the chamber 41 where it exerts pressure against the diaphragm 45 and against the valve member 54–57. The areas of the diaphragm and of the valve member are equal so that these pressures balance each other, and therefore the opening and closing of the valve will be easily effected, and is controlled by external forces. Means are provided for exerting force against the inner end of the stem 49, thereby tending to open the valve, whereupon high pressure gas is permitted to flow into the chamber 28 and connected parts and build up pressure therein. This pressure will be exerted against the diaphragm 33–35, and tend to force the same outwardly, or into the central chamber 30, thereby seating the valve. Such seating of the valve will occur when the outward pressure of the diaphragm balances or slightly overcomes any unseating force against the stem 49.

It will be noted that the two reducing valves are so placed that they act in opposition to each other, and that the seating movements of the two stems are towards each other, and that the unseating movements of said stems are away from each other. Furthermore, by making the parts of the two reducing valves duplicates, it will be seen that the delivery pressures at which they will act will be equal, so that the reduced pressures of the two gases will be equal.

Between the inner ends of the two stems 49, and within the chamber 30 I place a control member and spring device for controlling the two valves, and also for ensuring balancing of the two valves against each other.

For this purpose there is secured a head block 70 to the inner end of one stem 49, said head block carrying the two tapered rollers 71 and 72 which are journalled radially in the head block. The inner end of the other stem 49 of the other reducing valve carries the head block 73 which has the flat and radially extending surface shown in FIGURE 7. There is another control block 74 located between the head blocks 70 and 73, said control block 74 being provided with cam surfaces 75 and 76 in position to receive the rollers 71 and 72 (see FIGURES 7, 9 and 10). A ball thrust bearing 77 is placed between the head block 73 and the back face of the control block, since these parts have relative movement. It will be understood that the stems 49 are held against rotation since they are securely locked to their diaphragms but they have slight back and forth movement.

When the two reducing valves are in operation, their stems 49 are forced towards each other, and thereby there is created a tendency to rotate the control block to an initial position in which both of the reducing valves are seated. By forcibly turning the control block the two stems will be forced apart, thereby unseating one or both of the valves, and high pressure gas will be expanded into the two chambers 28, building up pressure therein, until finally the forces against the diaphragms 33–36 will be sufficient to cause the control block to rotate backwardly against the force which turned it forwardly, and finally both of the valves will be again seated.

There is a sleeve 78 journalled to the neck 79, which neck is carried by the flange 80 in stationary manner. The sleeve 78 carries the outwardly extending flange 81, and also carries the worm gear 82 by which the parts are controlled. There is placed a suitable spring between the control member 74 and the flange 81, so that by turning the worm gear and flange 81, the spring will be placed under force or loaded, and thereby tend to force the control member 74 with a force depending on such spring loading. Thus the control member is placed under spring force of adjusted amount, and at the same time there is established a yieldable connection to the control member so that the same can yield back and forth as one or both of the reducing valves functions.

There is a control shaft 82ᵃ extended through the chamber 30, so that said shaft extends to the outside of the chamber at each side, but passes close to the worm gear within the chamber. The worm 83 is mounted on said shaft within the chamber and in mesh with the worm gear. One end of the control shaft carriers the hand crank 84 by which the shaft is turned to adjust the device for pre-determination of the value of the reduced pressure of the delivered gases; or said shaft may be turned in any other convenient manner as will be presently explained.

It will be noted that the main moving parts of the device which are subject to frictional contact are contained within the chamber 30, and also that certain of these parts should be so placed that they can be readily reached for adjustment from time to time. I have therefore provided the chamber 30 with the removable plate 85, which, when removed, gives access to the chamber through a large bottom opening, ample to permit ready access to those parts which may require adjustment in the initial assembly of the device, or afterwards. Also, suitable lubricant may be placed within the chamber 30 to such amount as will effectively lubricate the parts contained therein, thereby ensuring very sensitive operation of the cams, and other parts subject to movement. In this connection it may be noted that normally it is not necessary to provide for more than a few hundredths of an inch movement of the valves 54–57—in some cases not over a hundredth of an inch; and therefore the slight quivering or hunting back and forth motion of the control member 74 as the valves are in use, will be only a few degrees of arc, the cams being of suitably steep taper. Thus a very sensitive device is produced, and one which will maintain the pressures of the delivered gases equal and constant to a very small degree of tolerance.

It is here noted that the back pressure on the diaphragms 35–37 opposes the pressure existing within the chamber 28, and that the pressure which must be built up within said chamber 28 in order to seat the valve, is equal to the air pressure within the chamber 30 and against the diaphragm 35 plus the unseating force due to the pre-loading of the spring 115 of the control member. Therefore, in case of change of the pressure of the outside air (if the chamber 30 is in communication with the outside air), as for example, when ascending to higher altitudes, the calibration of the device will be changed, with corresponding change of the pressure above absolute zero at which the gases delivered by the reducing valves, will be delivered. In order to prevent such result and to ensure constant operation and constant delivery pressure above absolute zero at various altitudes and various outside barometric readings, I have provided means whereby the chamber 30 may be evacuated, thus ensuring a constant absolute zero back pressure within such chamber 30. Under such conditions the operations will be solely effected by the pre-loading value of the spring. To produce such evacuation of the chamber 30, I have, in FIGURE 2 shown, more or less schematically, the syphon unit 85ª of conventional design and operation; and the aspirating connection of such syphoning unit 86, is connected by the tube 87 with one of the high pressure supply tubes 66 or 67, so that such syphoning unit will receive a constant supply of a small stream of high pressure gas, thus maintaining the desired vacuumized condition within the chamber 30. Conveniently such supply of high pressure gas may be derived from the high pressure air side of the supplies. The connection 88 of the syphoning unit, being the suction side of such unit, is then connected by the tube 89 with the interior of the chamber 30 to maintain the desired vacuum in such chamber. If desired a check valve 90 may be included in such tube 89, to prevent backflow of air therethrough, since the vacuum, once produced within the chamber 30, will only be broken by leakage into such chamber 30. Accordingly, it is usually unnecessary to maintain the syphoning unit in continuous operation. Frequently the development of a vacuum within such chamber 30 will be unnecessary. However, when such vacuumized condition is produced and maintained in the chamber 30, the need of re-calibration of the operation of the unit will be avoided.

Instead of provision of the vacuumized condition within the chamber 30, for the purposes already stated, a spring 91 may be located behind the stem 49 at the location of each of the pressure reducing valves, or behind each of the valve elements 54–57, each such spring being characterized to exert the same pressure in the valve seating direction as the total force exerted on the corresponding diaphragm 35–36 due to the sea-level pressure on one side of such diaphragm, and zero or vacuum pressure on the other side thereof. In either case disclosed above (the springs 91, characterized as above explained, or the vacuumized condition of the chamber 30), the control device spring 115 should be of such characteristics as to just balance the seating force produced by such spring 91, or by vacuumized chamber 30, as a pre-loaded condition of such spring 115. By thus pre-loading such spring 115, the zero point of the pressure scale will be that corresponding to zero absolute pressure, so that the delivered pressures of the pressure reduced gases will be readily measurable on a scale of absolute pressure. This scale will be explained hereinafter.

The gases delivered by the two reducing valves are to be brought together and mixed in pre-determined proportions. The construction for producing this result will next be explained, as follows:

The two delivery ports 68 and 69 for the low-pressure (pressure-reduced) gases are connected to the two sides of a manifold 92, such connection preferably being made by means including the flexible connectors 93 and 94. In the central portion of such manifold there is a semi-circular partial partition 95 having the large rectangular ports 96 and 97 which give access to the mixing chamber 98, also of semi-circular form. The delivery connection or pipe 99 leads from such chamber 98 for delivery of the mixed gases under the pre-determined pressure, to the point of consumption or distribution.

Within the chamber 98 and directly behind the ports 96 and 97 there is placed the quadrant shaped valve 100 which can be rocked back and forth through approximately 90 degrees of arc, being for this purpose mounted on the vertical shaft 101. The valve normally stands in position to fully close one of the ports, for example 96, leaving the other port fully open; and as the valve is rocked from such defined position it gradually opens the port 96 and simultaneously closes the port 97, so that the relative amounts of port openings are changed during such rock. Manifestly the incremental changes in the openings of the two ports will depend on the forms of such ports, as well as the form of the valve itself. I have provided a semi-circular mask 102 placed between the partial partition 95 and the valve member 100. Such mask can be inserted or removed conveniently by first removing the plate 103 from the bottom face of the manifold. This mask is shown, more or less diagrammatically and in development, in FIGURE 12 under the condition that the openings and closings produced by the rock of the valve through successive equal increments of rock, shall establish the ratios of gases called for by the curve B of FIGURE 13. That is to say, the valve will commence with full opening of the air port 97 for sea-level pressure and simultaneous full closing of the valve 96 for zero delivery of helium (or other gas); and as the ratio between the two gases is to be changed, the valve 97 will close and the valve 96 will open, the incremental closings and openings being such that, for equal increments of valve movement, the ratios between the openings at any given position will correspond to the ratios of air and helium (or other gas) which are to be delivered at various pressures, or for other reasons. It will be seen from examination of FIGURE 12 that a given movement of the shaded area (representing the member 100) downwardly will uncover a given portion of the port 96ª; and due to the curved forms of the ports, these variations of areas so covered and uncovered, will be according to the form of the curve B. In case it is desired to provide any other form or manner of variation of the ratios of the port openings, such result may be secured by substitution of another mask having the properly formed ports therein.

The valve 100 is directly connected to the control shaft 82ª, such result being secured by the worm gear 104 having the hub 105 which can be secured to the shaft 101 by means of the set screw 106, the control shaft 82ª carrying the worm 107 meshing with the worm gear 104. The valve shaft 101 is also provided with the knurled button 108 by means of which it may be turned by hand to secure independent valve movement, in case such operation be desired, the set screw having first been released.

Conveniently there is placed a thin plate 109 on the knurled head or button 108, the same being provided with the markings 110 (see FIGURE 2) to indicate valve openings or ratios for which purpose the pointer 111 is also provided with the dial 112 connected to the control shaft 82ª by the worm gear and worm connections 113–114, so that this dial will turn with the control shaft movements, and therefore according to the changing delivery-reduced-pressure of the gases. Due to the fact that both of the dials 110 and 112 are moved by the control shaft, it is necessary to bring them into proper coordination. Accordingly, I have provided the set screw 106 already referred to, whereby this result may be produced. It may also be necessary or desirable to substitute other dials from time to time, as for example, when the mask is changed. Such substitutions may also be readily made, with replacement of the plate 109 by another plate carrying proper markings, and properly calibrated.

The spring unit 115 (see FIGURE 7) of the control element preferably comprises three coiled spring elements, all coiling in the same direction, and the middle one being of double the strength of each of the two outside ones. The ends of such middle spring element are connected to the control member and to the flange 81 at positions 180 degrees from the positions of connection of the ends of the two outside spring elements. Thus the radial components of force developed by the loadings of the spring elements will balance each other, with avoidance of lateral friction components against the bearings, and which would otherwise be generated due to such radial components of force; it being also understood that in the case of pressure reductions by large sized units the spring elements will probably be of considerable length.

It will be understood that the delivery opening from the ratio determining valve, such opening being defined by the flange 99 (FIGURES 2, 3, 4, 5, 6 and 7), connects to whatever conduit is intended to receive the gas mixture. Therefore the pressure of the delivered gas flowing through such flanged opening will be that reduced pressure for which the unit is set and is operating. Such pressure, although a reduced pressure, may nevertheless be considerable, especially when the mixture is being delivered to a caisson or to a deep-sea diver operating at considerable depth below the water surface. Nevertheless, it may, in some cases, be desirable to produce a slight back pressure against the mixed gases directly after they leave the proportioning valve, to better ensure intimate mixing of the components. Accordingly, I have, in several of the figures shown the wing valve including the wings 184 and 185 in the delivery flange connection, the same being pivoted on the shafts 186 and 187, respectively, so that such wings swing towards and from each other to provide an opening between them more or less according to the volume of the mixture then being demanded. Light springs 188 and 189 are provided on these shafts 186 and 187, urging the wings to rock in the closing direction. Such springs will thus serve to produce a differential of pressure or pressure drop as the gas mixture passes between the wings, such differential usually being a minor matter in comparison to the absolute pressure (reduced) at which the mixture is finally delivered to its point of consumption or use.

It is noted that both the adjusted position of the spring unit 115 and the rotated position of the valve element 100 are related to each other by the common adjusting shaft 82ª. Due to this relation, when used, the relative proportions of the two gaseous components are directly related to the delivered pressure of the gases. This relationship is consonant with the requirements imposed by the relationship between gas proportions and pressures as defined, for example by the curves of FIGURES 13 and 14. Since the relation between the proportions of the two gaseous components is produced by the form of the openings in the mask plate of the dual valve, it follows that any specified relation of such proportions of the two gases, varying according to some variable of the gas pressures, may be obtained by substitution of the mask having its openings formed to meet the defined specifications.

It has also been stated that the adjustment of the spring produced by use of the hand crank 84 may, if desired be produced by rotation of the shaft 82ª by other means, such as by connection of such shaft with the equipment carried by the diver, to rotate such shaft according to the descents or raisings of the diver during his operations. It is noted that such shaft 82ª is shown in FIGURE 8 as being broken away at its lower end (proximate to the viewer of such figure). Accordingly, such shaft may be connected to some element of the structure to which the gaseous mixture is being delivered, for automatic control of the functions of the pressure reducing and proportion controlling unit, for such automatic control of the delivered pressure and the delivered proportion of the gaseous components to each other, as may be required from time to time, by such structure to which the mixture is being delivered.

I claim:

1. A multiple balanced pressure-reducing and delivering and proportion-controlling valve unit; comprising in combination a pair of pressure reducing valve units, each including a reduced-pressure gas-receiving chamber, and a control valve opening into such chamber, and including adjustable delivered-reduced-pressure regulating means, together with a common delivered-reduced-pressure control unit between the delivered-pressure, reduced-pressure regulating means of the two valve units; said control unit being constituted to cause each of the pressure reducing valve units to deliver gas into its gas-receiving chamber at the same reduced pressure as the other pressure reducing valve unit; together with a gas reduced-pressure receiving manifold in proximity to both of the valve units, and having its end portions in communication with the proximate chambers; together with a common delivered gas proportioning valve element located in the central portion of the manifold, and dividing the manifold into separated portions communicating with the respective reduced-pressure gas-receiving chambers; wherein said proportioning valve includes a mixed gas delivery opening in the manifold at the location of the proportioning valve element; and wherein said proportioning valve includes a circular arcuate partition extending across the central portion of the manifold and having its end portions connected to the manifold wall at the sides of said mixed gas delivery opening, a segmental arcuate movable valve element journalled for rotary movement about an axis coaxial with the partition, an arcuate mask plate between the proximate opposing surfaces of the partition end of the valve unit; together with means constituted to rock the movable valve element about its axis, to selected angular positions.

2. A valve structure as defined in claim 1; wherein the common delivered-reduced-pressure control unit is adjustable in manner constituted to cause the delivered gas to be delivered into the reduced-pressure gas-receiving chamber of each valve unit at the same reduced pressure as is delivered by the other valve unit; together with means to adjust said control unit for delivery of gas by each valve unit at a pre-selected pressure.

3. A valve structure as defined in claim 2; together with common means to adjust said pressure control unit to the pre-selected pressure, and to simultaneously cause the movable valve unit of the proportioning valve to be in moved position corresponding to a pre-determined relation between the reduced pressure of the gases and the proportions of such gases delivered through the proportioning valve, to each other.

4. A valve structure as defined in claim 3; wherein the pre-determined relation between the reduced pressure of the gases and the proportions of such gases delivered through the proportioning valve, to each other, varies according to a predetermined proportion for different reduced gas-pressure values and wherein the control unit and the proportioning valve, and said common means to adjust the control unit and to cause the movable proportioning valve unit to be in moved position corresponding to a pre-determined relation between the reduced pressure of the gases and the proportions of such gases to each other, is constituted to cause the pressure control unit, and the movable proportioning valve unit, to be in successively moved positions related to each other at each such position, to correspond to the pre-determined relation between the reduced pressure of the gases and the proportions of such gases to each other, for each such moved position of said parts.

5. A valve structure as defined in claim 4; wherein the gases comprise oxygen and an inert gas suitable for intake into the human breathing system; wherein the pre-determined relation between the reduced pressure of the gases and the proportions of such gases to each other, comprises a pre-determined proportion of the oxygen and such inert gas, pre-determined according to the reduced pressure of the mixture of such oxygen and such inert gas.

6. A valve structure as defined in claim 5; wherein the inert gas comprises helium.

7. A valve structure as defined in claim 5; wherein the inert gas comprises helium and nitrogen.

References Cited by the Examiner

UNITED STATES PATENTS

| | | | |
|---|---|---|---|
| 1,780,589 | 11/1930 | Hendrix | 137—99 |
| 2,330,151 | 9/1943 | Smith | 137—612 X |
| 2,725,067 | 11/1955 | Howell | 137—612 |
| 2,986,152 | 5/1961 | Boyer | 137—99 |

WILLIAM F. O'DEA, *Primary Examiner.*

CLARENCE R. GORDON, *Examiner.*